Nov. 15, 1960
C. T. JORGENSEN
2,960,210
CONVEYOR CHAIN
Filed June 19, 1957
3 Sheets-Sheet 1
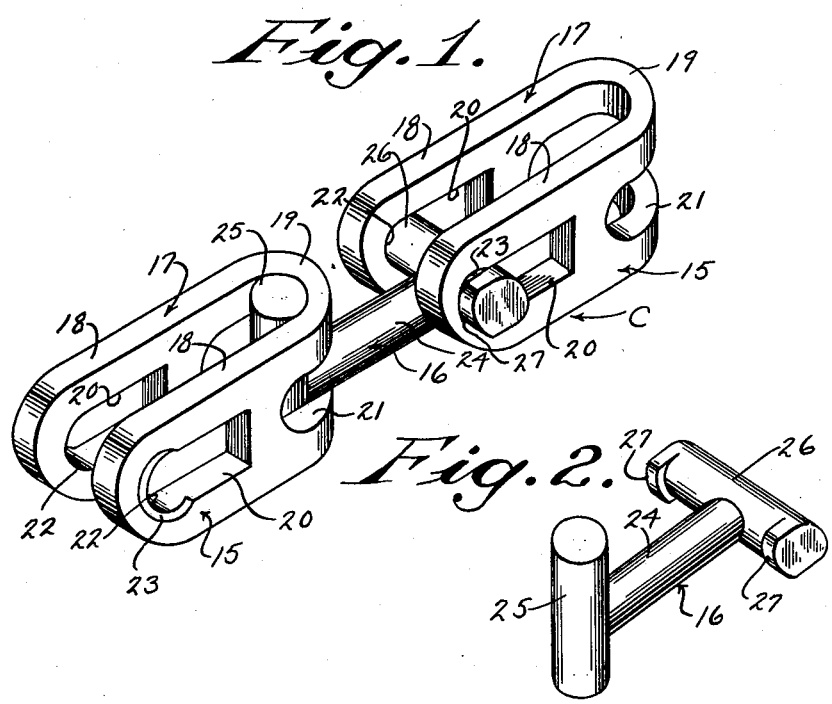
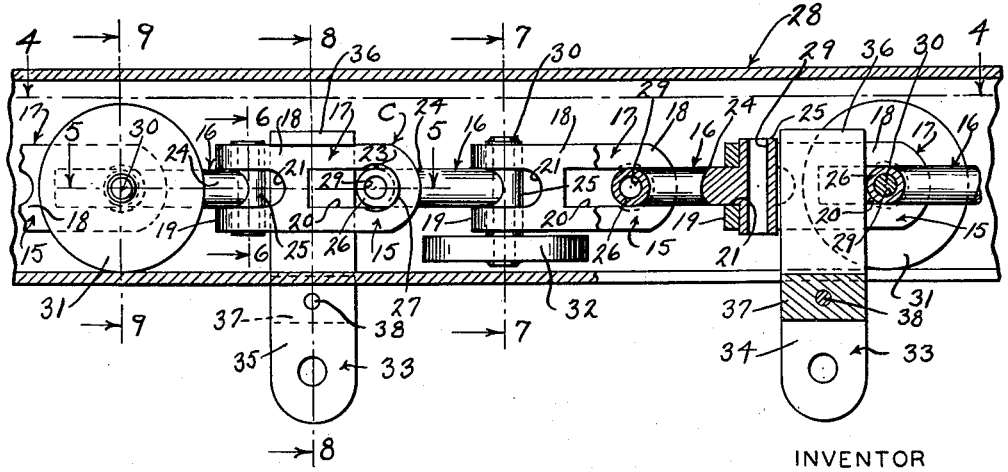
INVENTOR
CHARLES T. JORGENSEN
BY
*Young and Wright*
ATTORNEYS Nov. 15, 1960 C. T. JORGENSEN 2,960,210
CONVEYOR CHAIN
Filed June 19, 1957 3 Sheets-Sheet 2
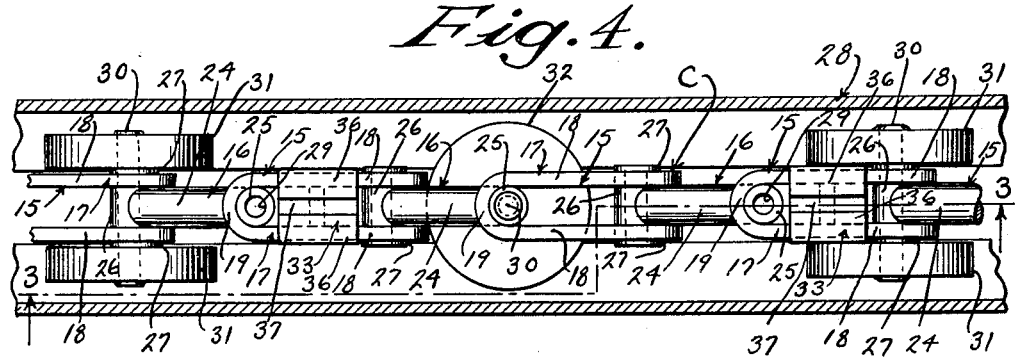
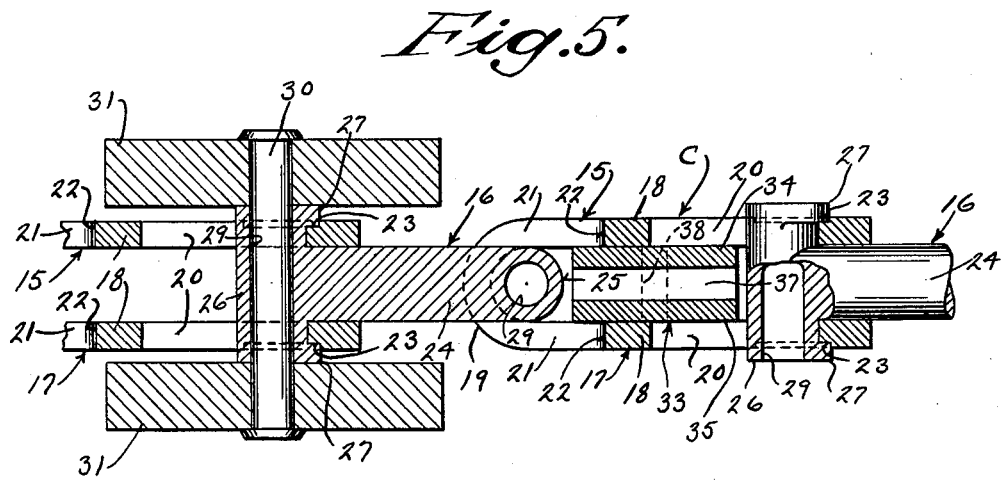
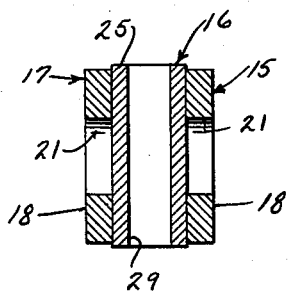
INVENTOR
CHARLES T. JORGENSEN
BY
ATTORNEYS

INVENTOR
CHARLES T. JORGENSEN

BY
Young and Wright
ATTORNEYS

United States Patent Office 2,960,210
Patented Nov. 15, 1960

2,960,210

CONVEYOR CHAIN

Charles T. Jorgensen, 6208 N. 38th St., Milwaukee, Wis.

Filed June 19, 1957, Ser. No. 666,613

2 Claims. (Cl. 198—177)

This invention appertains to conveyors, and more particularly to a novel chain capable of general usage, such as for overhead trolley conveyors of all types, floor conveyors of all types, flight conveyors, scraper conveyors, conveyors for agricultural machinery, etc.

One of the primary objects of my invention is to provide a conveyor chain which will be strong and durable, but light in weight, and which embodies a minimum number of parts that can be easily and quickly assembled or taken apart, and which effectively takes the place of the so-called drop forged chain, which is heavy and awkward to handle, difficult to assemble or take apart, and which embodies a number of complicated parts.

Another salient object of my invention is to provide a conveyor chain that can freely flex in all directions and thus conform itself to all types of tracks of different curvatures, which is in contra-distinction to all of the other types of chains with which I am familiar, that can only flex in one plane.

A further object of my invention is to provide a flexible conveyor chain which embodies main links of like character and pin links of like character, the pin links having right angularly disposed bearing members at their opposite ends for insertion into and for bearing engagement with the main links, the construction being such that all links, when the chain is assembled, are of substantially equal lengths or distances apart from one pivot to the other.

A further important object of my invention is to provide a flexible chain which merely embodies two parts, namely, the main link and the pin link, with the main link being of an integral construction and the pin link being of an integral construction, whereby the use of independent bearing pins, etc. is entirely eliminated.

A still further important object of my invention is the provision of means whereby the bearing members or pins on the opposite ends of the pin link form efficient means for receiving and supporting axles for rollers arranged in different planes, so that the chain can be effectively employed in overhead trolley type conveyors or in floor type tow conveyors.

A still further important object of my invention is the provision of means, whereby the main links can easily and quickly receive various types of chain attachments so that the chain can carry depending brackets of various types for supporting articles or laterally extending side wings of various types for flights, scrapers, or for engaging other chains, etc.

A still further important object of my invention is the provision of bearing nibs on certain pins of the pin links for engaging guide bearing recesses in the main link.

With these and other objects in view, the invention consists in the novel construction, arrangement and formation of parts, as will be hereinafter more specifically described and claimed and illustrated in the accompanying drawings, in which drawings, Figure 1 is a perspective view of a portion of a chain embodying my novel links;

Figure 2 is a detail perspective view of the pin link;

Figure 3 is a fragmentary vertical longitudinal sectional view showing one type of my chain employed as an overhead trolley type conveyor, the section being taken on the line 3—3 of Figure 4, looking in the direction of the arrows, the view also illustrating the use of guide rollers and depending brackets with the chain;

Figure 4 is a fragmentary horizontal longitudinal sectional view taken on the line 4—4 of Figure 3, looking in the direction of the arrows, the novel chain being shown in top plan;

Figure 5 is an enlarged detail horizontal sectional view through the chain taken on the line 5—5 of Figure 3, looking in the direction of the arrows and illustrating more particularly the novel construction of the links for receiving the axles for guide rollers and brackets for supporting articles;

Figure 6 is an enlarged detail sectional view taken on the line 6—6 of Figure 3, looking in the direction of the arrows and illustrating more particularly one of the vertical bearing pins of a pin link;

Figure 7:
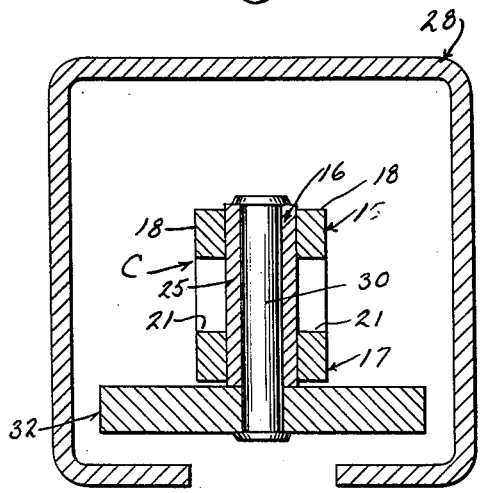
Figure 7 is an enlarged transverse sectional view taken on the line 7—7 of Figure 3, looking in the direction of the arrows, showing the means for carrying a horizontally disposed guide roller by one of the bearing pins of the pin link.

Referring to the drawings in detail, wherein similar reference characters designate corresponding parts throughout the several views, the letter C generally indicates my novel chain and the same embodies main links 15 and pin links 16.

Each main link 15 includes a U-shaped body 17 having spaced parallel side bars 18 and a connecting arcuate bight portion 19. The side bars 18 are provided with transversely aligned slots 20 and the arcuate bight portion 19 has formed therein a centrally disposed slot 21 which extends into the side bars 18 toward the slots 20. The outer ends of the slots 20 are rounded, as at 22, to form bearing surfaces for a purpose, which will later appear. The outer faces of the side bars 18 at the rounded portions 22 of the slots, have formed therein bearing grooves 23 constituting a part of a circle. The main links can be stamped, cast, or forged and preferably the main link is formed from a flat strip with the slots 20 and 21 stamped therefrom, and after such stamping, the body of the link is bent into its U-shaped form.

Each pin link 16 includes a shank 24, preferably, but not necessarily of a cylindrical configuration. Formed on one end of the shank is a vertically extending bearing pin 25 and formed on the opposite end of the shank is a horizontally disposed bearing pin 26. The pin links can be fabricated in various ways, such as cold or hot cast; forged, or upset. It is also possible to form the pin links on automatic screw machines. The ends of the bearing pin 26 can have formed thereon inwardly directed arcuate nibs 27 which are adapted to fit in the grooves 23 of an adjacent main link 15, as will now appear.

In assembling the links, the pin link 16 is turned and disposed in an angle position relative to the main link 15 and at this time the bearing pin 25 is inserted into the main link through the slot 21 and as the same is inserted the link is turned so that the bearing pin 25 will assume its vertical position and bear against the arcuate bight portion which also forms a bearing therefor. The bearing pin 26 is manipulated in conjunction with an adjacent main link 15 so that the same will slip into the main link at an angle and permit the insertion thereof into the slots 20, and at this time the links 15 and 16 are drawn apart so that the bearing pin 26 will ride against the arcuate bearing faces 22. The nibs 27 will now ride on the walls of the grooves 23 and this will effectively prevent lateral shifting of the bearing pin 26 in its main link 15. This operation is continued until the complete chain is formed and it can be seen that main links 15 can rock on the pins 25 in a horizontal plane and that adjacent main links 15 can rock on pins 26 in a vertical plane. Thus the chain can freely flex in two different planes and in effect, I have provided a conveyor chain having a universal movement.

While I have stated that the pin 25 is arranged in a vertical plane and the pin 26 in a horizontal plane, it is to be understood that this is only the preferred normal position and that the chain can function equally as well with the chain placed on its side, that is, with the side bars 18 in a horizontal plane, as called for in some uses of my chain.

Figure 8:
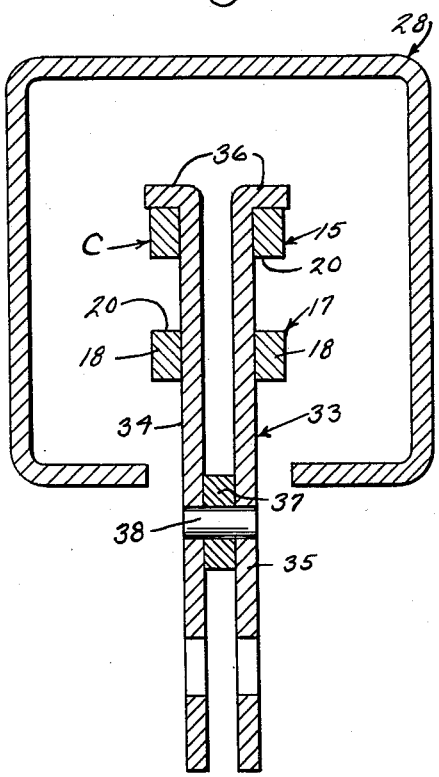
Figure 8 is an enlarged detail transverse sectional view, taken on the line 8—8 of Figure 3, looking in the direction of the arrows and illustrating the novel means for associating a depending bracket with one of the main links of the chain.
Figure 9:
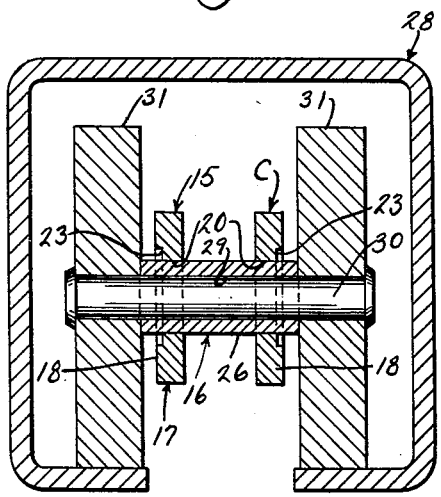
Figure 9 is a view similar to Figure 8 but taken on the line 9—9 of Figure 3, looking in the direction of the arrows and illustrating the means for supporting vertically disposed guide rollers from one of the pins of the pin link.
Figure 10:
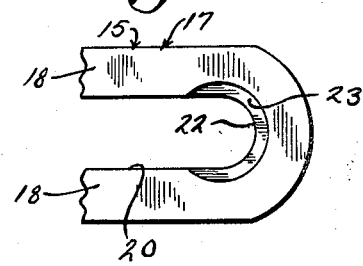
Figure 10 is a fragmentary detail top plan view showing one end of a main link, with the bearing guide recess therein.

As brought out in the objects of the specification, the chain is of a character as to permit the same to be used for all general purposes that I am familiar with, and the same adapts itself for use with overhead conveyors of all types, and in Figures 3 to 9, inclusive, I have shown one use of my chain, namely, as an overhead conveyor. In the particular instance shown in Figures 3 to 9, I have shown the chain in use with a track 28 of the box type, but it is to be understood that the same can be used with various types of tracks, such as I-beams, double angles, etc.

When the same is used as an overhead conveyor, the pins 25 and 26 of the pin links 16 form an ideal means for supporting guide rollers and hence the pins are provided with longitudinal bores 29 which receive axles 30. The axles 30 carried by the horizontal pins 26 have mounted on their opposite ends rollers 31 and while I show the rollers in the drawings bearing directly on the axles, it is to be understood that the rollers can be of the type having hubs provided with roller or ball bearings. The terminals of the axles carrying the rollers 31 can be upset, as illustrated, or the same can be threaded or otherwise treated for receiving holding nuts or set screws. The rollers 31 ride on the lower flanges of the box track 28 and carry the chain and the load. In other types of track, the rollers can be modified for travelling on the flanges of an I-beam or double angle beam, etc. The axles 30 carried by the vertical beams 21 have rotatably mounted on their lower terminals horizontally disposed guide wheels 32 and these wheels can also be provided with anti-friction hubs should such be desired.

The main links 15 form an ideal means for receiving various types of adjuncts, such as depending brackets, laterally projecting wings, etc. and in Figures 3 to 9, I have shown the use of depending brackets 33 for carrying loads or for other purposes. I preferably form these brackets in a special way and as illustrated the same include independent side plates 34 and 35. The upper ends of these plates are provided with right angularly extending arms 36. The plates 34 and 35 are dropped through the main links 15 between the side bars 18 thereof until the arms 36 rest on top of the side bars. A spacer plate 37 is then placed between the plates and held in place in any preferred manner, such as by a pin 38. This holds the bracket in assembled condition and as it can be seen, the bracket can be easily and quickly associated with the desired links. Where laterally extending side wings are utilized, the plates forming the side wings can be placed through the slots 20 in the side bars 18 of the main links.

Among the other features and advantages of my chain as previously set out, it can be seen that the links can slide relative to one another longitudinally for a limited distance only, and hence the chain can be effectively used for either a pull or push feed. Where the chain travels over a drive sprocket the teeth of such sprocket enter into the main links 15 between bearing pins 25 and 26.

Various other changes in details may be made without departing from the spirit or the scope of this invention, but what I claim as new is:

1. A flexible conveyor chain comprising main links of like character and of integral construction and pin links of like character and integral construction, each of the main links including a U-shaped body having spaced side bars and a connecting arcuate bight portion forming a bearing, said bight portion having a slot opening out therethrough and said side bars having aligned slots therein with the outer ends thereof forming arcuate bearing faces; said pin links each including an elongated connecting shank and right-angularly disposed bearing pins on the opposite ends of the shank, one pin being insertable through the slot in the bight portion for bearing engagement with the bight portion and the other of said pins being insertable in the main link through the slots in the side bars thereof for engagement with the bearing faces of said last-mentioned slots and with the main links in spaced relation and the bearing pins in spaced relation in the slots defining openings in the main links between the bearing pins, whereby said chain can flex freely in different planes, brackets insertable in said main links, and each of said brackets including like side plates insertable in the main links between the side bars and having laterally extending arms engaging the upper surfaces of the side bars, and a spacer plate secured to said side plates for holding said side plates in engagement with the side bars against displacement.

2. A flexible conveyor chain comprising main links of like character and of integral construction and pin links of like character and integral construction, each of the main links including a U-shaped body having spaced side bars and a connecting arcuate bight portion forming a bearing, said bight portion having a slot opening out therethrough and said side bars having aligned slots therein with the outer ends thereof forming arcuate bearing faces; said pin links each including an elongated connecting shank and right angularly disposed bearing pins on the opposite ends of the shank, one pin being insertable through the slot in the bight portion for bearing engagement with the bight portion and the other of said pins being insertable in the main links through the slots in the side bars thereof for engagement with the bearing faces of said last mentioned slots and with the main links in spaced relation and the bearing pins in spaced relation in the slots defining openings in the main links between the bearing pins, whereby said chain can flex freely in different planes, and said side bars having arcuate bearing grooves in thier outer faces communicating with the slots in said side bars, and the bearing pins insertable in the last mentioned slots having laterally projecting nibs fitted in said grooves for turning movement whereby to prevent lateral shifting of the pin links in the main links.

References Cited in the file of this patent

UNITED STATES PATENTS

| 2,010,124 | Worrall | Aug. 6, 1935 |
| 2,490,682 | Freeman | Dec. 6, 1949 |
| 2,649,812 | Wylie | Aug. 25, 1953 |
| 2,768,733 | Wilson | Oct. 30, 1956 |